(12) United States Patent
Hockey (10) Patent No.: US 11,533,381 B1
(45) Date of Patent: Dec. 20, 2022

(54) METHOD AND SYSTEM FOR TRANSPARENT TCP PROXY TO CONTAINERIZED APPLICATIONS

(71) Applicant: Microsoft Technology Licensing, LLC, Redmond, WA (US)

(72) Inventor: Alex John Hockey, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/704,946

(22) Filed: Mar. 25, 2022

(51) Int. Cl.
*H04L 67/56* (2022.01)
*H04L 69/16* (2022.01)
*H04L 67/2895* (2022.01)
*H04L 67/2866* (2022.01)
*H04L 67/2876* (2022.01)

(52) U.S. Cl.
CPC .......... *H04L 67/56* (2022.05); *H04L 67/2866* (2013.01); *H04L 67/2876* (2013.01); *H04L 67/2895* (2013.01); *H04L 69/16* (2013.01)

(58) Field of Classification Search
CPC ............. H04L 67/2866; H04L 67/2876; H04L 67/2895; H04L 67/56; H04L 69/16
See application file for complete search history.

(56) References Cited

U.S. PATENT DOCUMENTS

| 7,519,047 | B1 * | 4/2009 | Macaulay | H04L 12/66 370/352 |
| 2015/0319132 | A1 * | 11/2015 | Moon | H04L 61/2521 709/245 |
| 2019/0104151 | A1 * | 4/2019 | Cheng | H04L 63/1425 |
| 2020/0120013 | A1 * | 4/2020 | Goud Gadela | H04L 45/745 |

OTHER PUBLICATIONS

"Original Source", Retrieved from: https/web.archive.org/web/20200402015153/https://www.envoyproxy.io/docs/envoy/latest/configuration/listeners/listener_filters/original_src_filter.html, Apr. 2, 2020, 2 pages.

* cited by examiner

*Primary Examiner* — Gil H. Lee
(74) *Attorney, Agent, or Firm* — ArentFox Schiff LLP (57) ABSTRACT

Example aspects include techniques for implementing a transparent TCP proxy for containerized applications. These techniques may include receiving an outgoing packet from the containerized application via a container bridge and determining, based on a connection associated with the outgoing packet, whether the outgoing packet corresponds to an incoming packet identified by a first marking as being redirected through the TCP proxy. In addition, the techniques may include in response to determining that the outgoing packet corresponds to the incoming packet, adding a second marking to the outgoing packet to indicate that the outgoing packet is to be routed through the TCP proxy, sending the outgoing packet to the TCP proxy based on the second marking, and transmitting an outgoing processed packet to an external device having the destination address, the outgoing processed packet resulting from a performance of a proxy operation by the TCP proxy on the outgoing packet.

20 Claims, 4 Drawing Sheets

METHOD AND SYSTEM FOR TRANSPARENT TCP PROXY TO CONTAINERIZED APPLICATIONS

BACKGROUND

Modern applications often require network security and/or other policies to be applied to application traffic. In some instances, instead of adding logic for network security and/or other traffic-related policies to each application, it has becoming increasingly common to implement the logic in a separate proxy process, and configure redirection of the application traffic through the proxy transparently. With the increased deployment of containerized applications for resource efficient virtualization, many systems are now processing containerized application traffic. In some instances, containerized application traffic may also benefit from and/or require redirection of the application traffic through a proxy. However, it has proven difficult to reliably redirect containerized traffic transparently through proxies in existing systems.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method for implementing a TCP proxy for a containerized application executing within a container of a host machine wherein the containerized application employs a container network namespace of the container and the TCP proxy employs a host network namespace of the host machine, may include receiving an outgoing packet from the containerized application via a container bridge, wherein the outgoing packet has a destination address external to the host machine and determining, based on a connection associated with the outgoing packet, whether the outgoing packet corresponds to an incoming packet identified by a first marking as being redirected through the TCP proxy. Further, the method may include in response to determining that the outgoing packet corresponds to the incoming packet, adding a second marking to the outgoing packet to indicate that the outgoing packet is to be routed through the TCP proxy and sending the outgoing packet to the TCP proxy based on the second marking, wherein sending the outgoing packet comprises reversing a first network address translation applied to the incoming packet. In addition, the method may include transmitting an outgoing processed packet to an external device having the destination address, the outgoing processed packet resulting from a performance of a proxy operation by the TCP proxy on the outgoing packet and wherein sending the outgoing processed packet comprises reversing a second network address translation applied to the incoming packet.

In another aspect, an example computer-readable medium (e.g., non-transitory computer-readable medium) storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing a transparent TCP proxy for containerized applications. In particular, aspects of the present disclosure provide a host system configured to transparently route containerized application traffic through a proxy. In some systems, application traffic may be redirected through a proxy for extensibility, scalability, and/or reusability benefits. For instance, application traffic to and from multiple applications may be redirected through a proxy that performs one or more operations on the application traffic instead of separately implementing the proxy functionality in each of the multiple applications. However, it is difficult to reliably redirect application traffic associated with a containerized application to a proxy given that a containerized application utilizes a different network namespace from the network namespace of the proxy (i.e., the network namespace of the host system of the containerized application). As a result, application traffic associated with a containerized application may be received by the containerized application or transmitted to an external device without being routed to a related proxy, which may lead to security failures and/or other networking errors. Accordingly, the present techniques reliably route application traffic of a containerized application to a related proxy by configuring a network stack of a host device to mark containerized application traffic and redirect containerized application traffic to and from a proxy based on the marking and updated routing rules, thereby extending the benefits of network proxies to containerized applications.

Illustrative Environment

Figure 1:
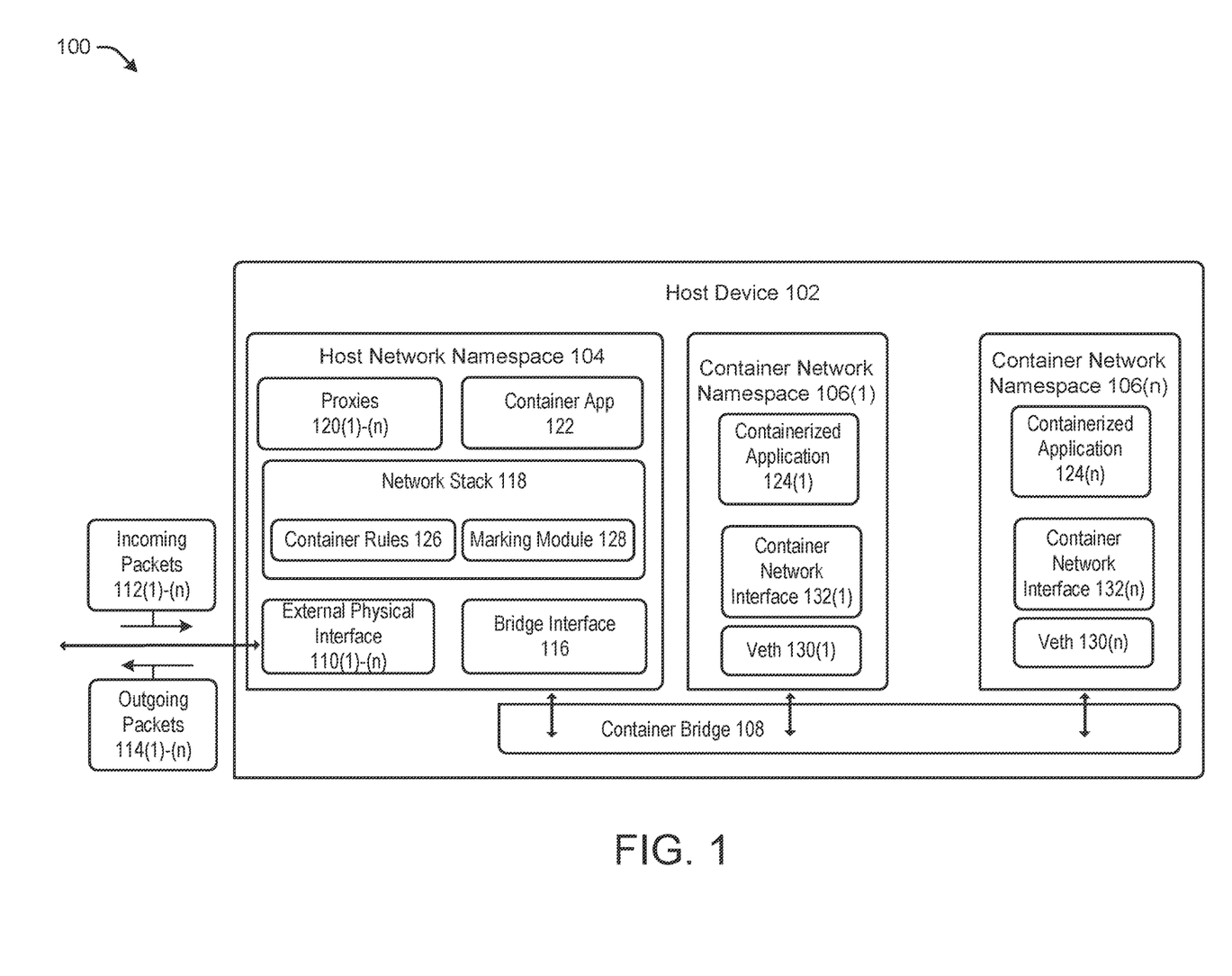
FIG. 1 illustrates an example architecture of a computing system implementing a transparent TCP proxy for containerized applications, in accordance with some aspects of the present disclosure.

FIG. 1 is a diagram showing an example of a system 100, in accordance with some aspects of the present disclosure.

As illustrated in FIG. 1, the system 100 may include a host device 102 configured to implement a transparent TCP proxy for containerized applications. Some examples of a host device 102 include computing devices, smartphone devices, Internet of Things (IoT) devices, unmanned aerial vehicles (UAVs), robots, process automation equipment, sensors, control devices, vehicles, transportation equipment, tactile interaction equipment, virtual and augmented reality (VR and AR) devices, industrial machines, etc. In some aspects, the host device 102 may be a cloud computing platform that provides other computing devices with distributed storage and access to software, services, files, and/or data via one or more network(s), e.g., cellular networks, wireless networks, local area networks (LANs), wide area networks (WANs), personal area networks (PANs), the Internet, or any other type of network configured to communicate information between computing devices.

As illustrated in FIG. 1, the host device 102 may include a host network namespace 104, one or more container network namespaces 106(1)-(n), and a container bridge 108. As used herein, in some aspects, a "namespace" may refer to an isolated partition of kernel resources. Further, a network namespace may be a logical copy of the network stack of the host device 102. In some aspects, network namespaces may be useful for setting up containers or virtual environments. For instance, an individual container network namespace 106 may virtualize a network stack, and include a private set of IP addresses, a routing table, socket listings, a connection tracking table, a firewall, and other network-related resources. 128

In some aspects, the host network namespace 104 may be a default or global namespace in which the external physical interfaces 110(1)-(n) of the host device 102 exist. Further, the host network namespace 104 may be configured to provide access to one or more external networks via the external physical interfaces 110(1)-(n). In particular, the host network namespace 104 may receive incoming packets 112(1)-(n) from external networks and transmit outgoing packets 114(1)-(n) to the external networks.

As illustrated in FIG. 1, the host network namespace 104 may include the external physical interfaces 110(1)-(n) (e.g., a network interface card), a bridge interface 116, a network stack 118, one or more proxies 120(1)-(n), and a container app 122 (e.g., a container daemon). The network stack 118 may be configured to process the incoming packets 112(1)-(n) and the outgoing packets 114(1)-(n). In particular, the network stack 118 may deliver the incoming packets 112(1)-(n) to a relevant user space process, deliver the outgoing packets 114(1)-(n) from a user space process to an external physical interface 110, and/or forward the incoming packets 112(1)-(n) and the outgoing packets 114(1)-(n) from a first network interface to a second network interface. In some aspects, the network stack 118 may include a firewall tool (e.g., iptables), a kernel hook framework (e.g., netfilter), and a routing table (e.g., ip route process). In addition, the network stack 118 may be configured to perform network address translation (NAT). As used herein, "NAT" may refer to a process of mapping an IP address space and/or TCP port to another IP address space and/or TCP port by modifying network address information of a packet in transit.

Each of the proxies 120(1)-(n) may be configured perform to one or more proxy operations. In some aspects, the proxy operations of a proxy 120 may filter and/or otherwise modify application traffic. For example, the proxy 120 may be configured to add transport layer security (TLS) support to an application of the host device 102. As another example, the one or more proxy operations may encrypt the contents of an outgoing packet 114 and/or decrypt the contents of an incoming packet 112. As another example, the one or more proxy operations of a proxy 120 may filter the contents of the incoming packets 112(1)-(n) and outgoing packets 114(1)-(n). In yet still some other examples, a proxy 120 may perform at least one of a layer 5 operation, a layer 6 operation, or a layer 7 operation of the open system interconnection (OSI) model. As described herein, in some aspects, the incoming packets 112(1)-(n) and outgoing packets 114(1)-(n) may be redirected to a proxy 120 for modularity, extensibility, scalability, and/or reusability benefits. For instance, one or more proxy operations may be implemented in a proxy 120, and application traffic from multiple applications may be redirected to the proxy 120 instead of implementing the proxy operations in each of the multiple applications.

As used herein, in some aspects, a "containerized application" may refer to a software package that contains an application in a complete file system having executable instructions, a runtime environment, system tools, system libraries, and/or other suitable components sufficient to execute the application. Some benefits of containerized applications include ease of use, standardization of execution environment, lightweight execution, and security via isolation. Further, containerized applications running on a single server or virtual machine may share the same operating system kernel and may make efficient use of system or virtual memory. For example, a container may include an application and all of its dependencies, but share the operating system kernel with other containers on the same host. As such, containers can be more resource efficient and flexible than virtual machines.

The container app 122 may perform one or more functions of an operating system (OS) level virtualization service. For example, the container app 122 may be a daemon that listens to requests for the virtualization service from containerized applications 124 and manages container objects associated with the virtualization service. Further, the container app 122 may be configured to modify the network stack 118 to route the incoming packets 112 and the outgoing packets 114 associated with the containerized applications 124. For example, the container app 122 may add container rules 126 to the network stack 118, and the container rules 126 may configure the network stack 118 to redirect incoming packets 112 destined for a particular containerized application 124 to a related proxy 120.

Each container network namespace 106 may correspond to a particular containerized application 124. For example, a first container network namespace 106(1) may correspond to a first containerized application 124(1), a nth container network namespace 106(n) may correspond to a nth containerized application 124(n), and so forth. Further, the bridge interface 116 may be configured to transmit incoming packets 112 to and receive outgoing packets 114 from the containerized applications 124(1)-(n) via the container bridge 108.

For example, an incoming packet 112(1) associated with the containerized application 124(1) may be received at the external physical interface 110(1), and redirected to a proxy 120(1) associated with the containerized application 124(1)

by the network stack 118 based on the container rules 126 set forth by the container app 122. Upon receipt of the incoming packet 112(1), the proxy 120(1) may perform one or more proxy operations on the incoming packet 112(1), e.g., the proxy 120(1) may filter the content of the incoming packet 112(1). Further, the proxy 120(1) may employ the marking module 128 of the network stack 118 to mark the incoming packet 112(1), and provide the incoming packet 112(1) to the network stack 118. In some aspects, the marking module 128 may employ the netfilter mark field to mark a packet or connection. Upon receipt of the incoming packet 112(1), the network stack 118 may redirect the incoming packet 112(1) to the containerized application 124(1) using NAT. Further, the network stack 118 may associate the marking with the connection corresponding to the incoming packet 112(1). As illustrated in FIG. 1, each container network namespace 106(1) may include a virtual ethernet device 130(1) and a container network interface 132(1) for providing the incoming packet 112(1) to the containerized application 124(1).

Further, in some aspects, the containerized application 124(1) may generate an outgoing packet 114(1) in response to incoming packet 112(1). In addition, the containerized application 124(1) may transmit the outgoing packet 114(1) to the network stack 118 via the container bridge 108. Upon receipt of the outgoing packet 114(1), the network stack 118 may identify the outgoing packet 114(1) as related to the connection of the incoming packet 112(1), and employ the marking module 128 to mark the outgoing packet 114(1). Further, the network stack 118 may redirect the outgoing packet 114(1) to the proxy 120(1) using NAT and routing rules based on the marking. In addition, the proxy 120(1) may perform one or more proxy operations on the outgoing packet 114(1), e.g., the proxy 120(1) may filter the content of the outgoing packet 114(1). Additionally, the proxy 120(1) may forward the outgoing packet 114(1) to the network stack 118, which may transmit the outgoing packet 114(1) to an external network via the external physical interface 110(1).

Example Processes

Figure 2:
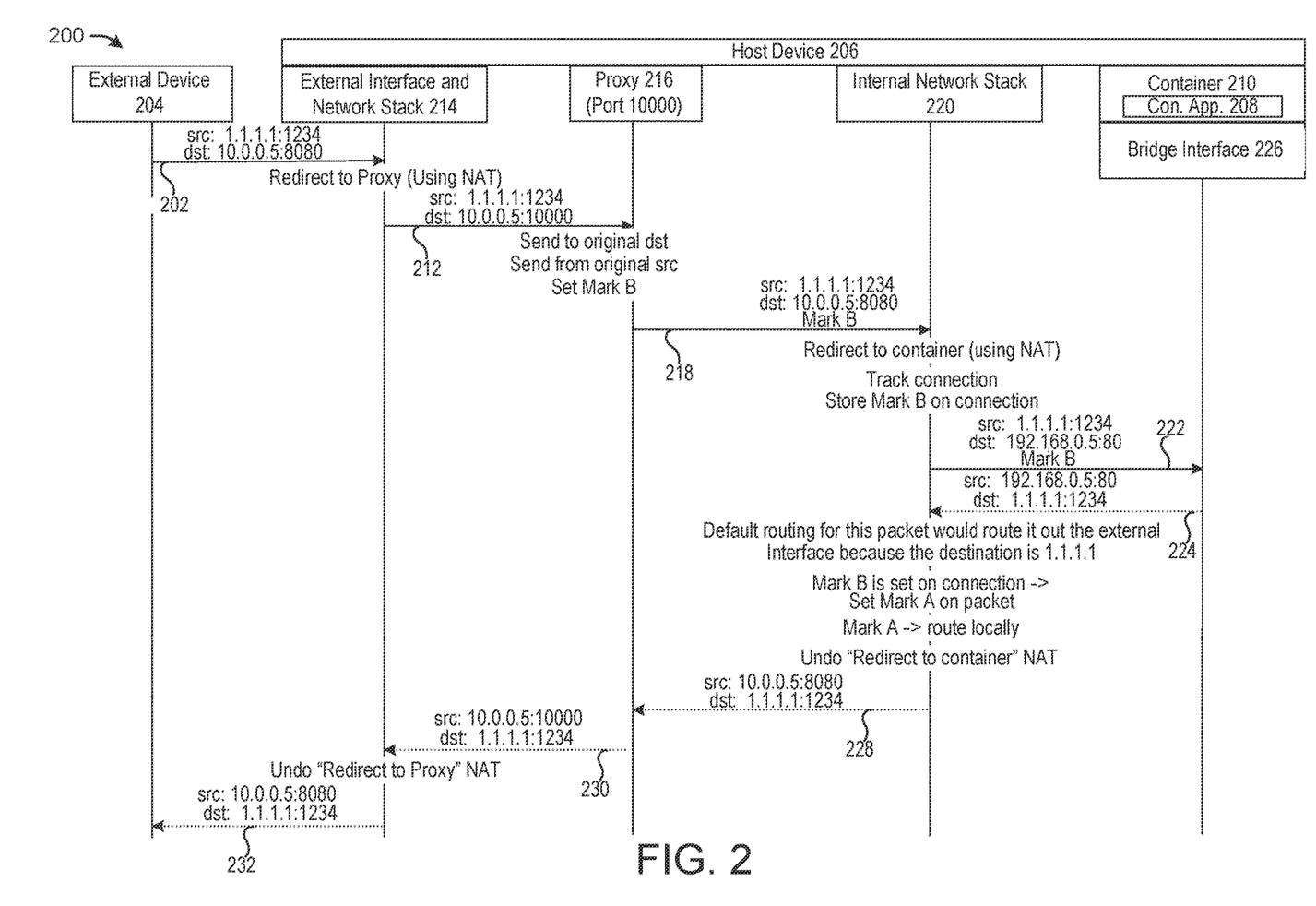
FIG. 2 is a flow diagram illustrating an aspect of an example method for implementing a transparent TCP proxy for containerized applications, in accordance with some aspects of the present disclosure.

FIG. 2 is a flow diagram illustrating an example method 200 for implementing a transparent TCP proxy for containerized applications, in accordance with some aspects of the present disclosure. As illustrated in FIG. 2, in some aspects, a packet may have source (src) address information (e.g., IP address and TCP port) and destination (dst) address information. Further, the address information may be modified by steps of the example method 200, e.g., via application of NAT.

At step 202, an external device 204 may transmit an incoming packet (e.g., the incoming packet 112(1)) to the host device 206 (e.g., the host device 102). As described in detail herein, the incoming packet may be destined for a containerized application 208 executing within a container 210 of the host device 206. For example, the incoming packet may have a destination address that includes a TCP port of a TCP/IP address corresponding to the containerized application 208, and this destination address is defined in a public address space.

At step 212, an external interface and network stack 214 (e.g., the physical interface 110 and the network stack 118) of the host device 206 may redirect the incoming packet to a proxy 216 of the host device 206 using a first NAT based on a port (e.g., a TCP port of a TCP/IP address) identified in the incoming packet. As illustrated in FIG. 2, the external interface and network stack 214 may perform a first NAT to route the incoming packet to the proxy 216 by updating the destination port of the incoming packet to match a port associated with the proxy 216. In other words, the first NAT updates the destination information by mapping it from the public address space to a private address space of the host network namespace (e.g., the host network namespace 104).

At step 218, the proxy 216 may perform one or more proxy operations on the incoming packet, mark the incoming packet with a first indicia for tracking purposes, update the destination port of the incoming packet from the port associated with the proxy 216 to the port associated with the containerized application 208, and transmit the packet to the internal network stack 220 of the host device.

At step 222, the internal network stack 220 (e.g., the network stack 118) may track the connection of the incoming packet via the first indicia by storing a mapping between the connection and the first indicia, and redirect the incoming packet to the containerized application 208 using a second NAT, which updates the destination address and port of the incoming packet for the internal network of the container network. In other words, the second NAT updates the destination information by mapping it from the private address space of the host network namespace to the private address space of the container network namespace (e.g., the container network namespace 106(1)).

At step 224, the bridge interface 226 (e.g., the bridge interface 116) may route the incoming packet to the containerized application 208 within the container 210, the containerized application 208 may process the incoming packet based upon one or more functions/processes of the containerized application 208, and the containerized application 208 may transmit an outgoing packet (e.g., the outgoing packet 114(1)) to the internal network stack 220 via the bridge interface 226.

At step 228, the internal network stack 220 may identify that the connection has been marked with the first indicia, mark the outgoing packet with a second indicia for internal routing to the proxy 216, reverse the second NAT applied to the incoming packet (e.g., the TCP port of the source address may be modified to undo the previous mapping to the address space of the container 210 given that the outgoing packet is now within the namespace of the host device 206), and forward the outgoing packet to the proxy 216 based up on the outgoing packet corresponding to the incoming packet and routing rules set by the container application for the containerized application 208.

At step 230, the proxy 216 (e.g., the proxy 120(1)) may perform one or more proxy operations on the outgoing packet, update the source port of the outgoing packet to the port associated with the proxy, and transmit the outgoing packet to the external interface and network stack 214.

At step 232, the external interface and network stack 214 may update the outgoing packet by reversing the first NAT (e.g., undoing the mapping to the container network namespace), and transmit the outgoing packet to the external device 204.

Figure 3:
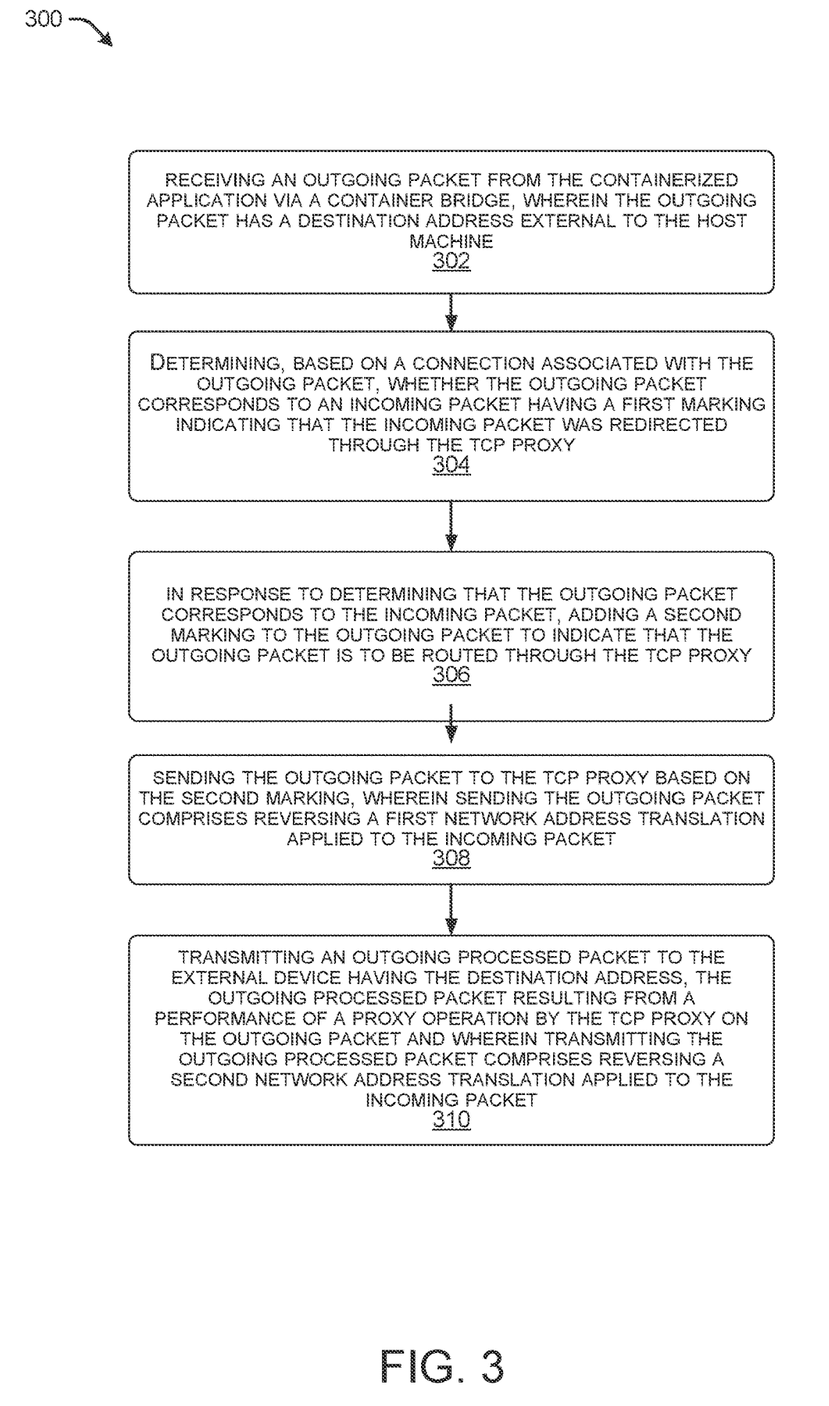
FIG. 3 is a flow diagram illustrating an aspect of an example method for implementing a transparent TCP proxy for containerized applications, in accordance with some aspects of the present disclosure.

FIG. 3 is a flow diagram illustrating an example method 300 for implementing a transparent TCP proxy for containerized applications, in accordance with some aspects of the present disclosure.

At block 302, the method 300 may include receiving an outgoing packet from the containerized application via a container bridge, wherein the outgoing packet has a destination address external to the host machine. For example, the containerized application 124(1) may transmit the outgoing packet 114(1) to the network stack 118 via the container bridge 108.

Figure 4:
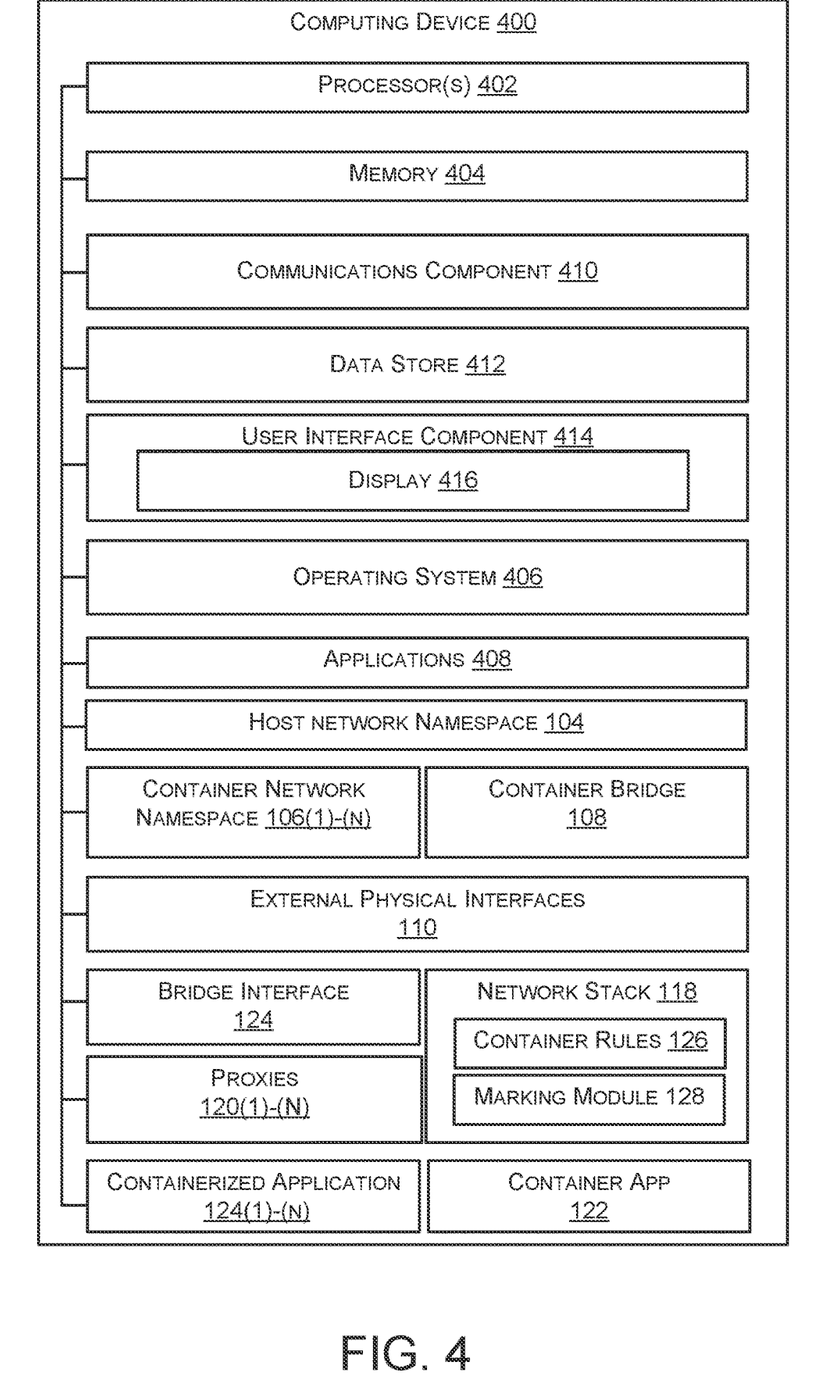
FIG. 4 is a block diagram illustrating an example of a hardware implementation for a computing device(s), in accordance with some aspects of the present disclosure.

Accordingly, host device 102, the computing device 400, and/or the processor 402 executing the network stack 118 may provide means for receiving an outgoing packet from the containerized application via a container bridge, wherein the outgoing packet has a destination address external to the host machine.

At block 304, the method 300 may include determining, based on a connection associated with the outgoing packet, whether the outgoing packet corresponds to an incoming packet identified by a first marking as being redirected through the TCP proxy. For example, upon receipt of the outgoing packet 114(1), the network stack 118 may determine that the outgoing packet 114(1) is related to the TCP/IP connection of the incoming packet 112(1), which was routed through the proxy 120(1) before receipt at the containerized application 124(1). As described herein, in some aspects, the network stack 118 may determine that the outgoing packet 114(1) is related to the TCP/IP connection based upon tracking the connection via a marking of the incoming packet 112(1).

Accordingly, host device 102, the computing device 400, and/or the processor 402 executing network stack 118 may provide means for determining, based on a connection associated with the outgoing packet, whether the outgoing packet corresponds to an incoming packet identified by a first marking as being redirected through the TCP proxy.

At block 306, the method 300 may include in response to determining that the outgoing packet corresponds to the incoming processed packet, adding a second marking to the outgoing packet to indicate that the outgoing packet is to be routed through the proxy. For example, the network stack 118 may employ the marking module 128 to mark the outgoing packet 114(1) based on determining that the outgoing packet 114(1) is a response to the incoming packet 112(1).

Accordingly, host device 102, the computing device 400, and/or the processor 402 executing the network stack 118 and/or the marking module 128 may provide means for in response to determining that the outgoing packet corresponds to the incoming processed packet, adding a second marking to the outgoing packet to indicate that the outgoing packet is to be routed through the proxy.

At block 308, the method 300 may include sending the outgoing packet to the proxy based on the second marking, wherein sending the outgoing packet comprises reversing a first network address translation applied to the incoming packet. For example, the network stack 118 may redirect the outgoing packet 114(1) to the proxy 120(1) based on a NAT applied to the incoming packet 112(1) and routing rules associated with second marking. In some aspects, the routing rules may be configured by the container application 122.

Accordingly, host device 102, the computing device 400, and/or the processor 402 executing the network stack 118 may provide means for sending the outgoing packet to the proxy based on the second marking, wherein sending the outgoing packet comprises reversing a first network address translation applied to the incoming packet.

At block 310, the method 300 may include transmitting an outgoing processed packet to an external device having the destination address, the outgoing processed packet resulting from a performance of a proxy operation by the proxy on the outgoing packet and wherein sending the outgoing processed packet comprises reversing a second network address translation applied to the incoming packet. For example, the proxy 120(1) may perform one or more proxy operations on the contents of the outgoing packet 114(1) to generate an outgoing processed packet. As an example, in some aspects, the proxy operation may encrypt the contents of the outgoing packet 114(1) to generate the outgoing processed packet. Further, the host device 102 may transmit the outgoing processed packet to the external device 204.

Accordingly, host device 102, the computing device 400, and/or the processor 402 executing network stack 118 and/or the external physical interface 110 may provide means for transmitting an outgoing processed packet to an external device having the destination address, the outgoing processed packet resulting from a performance of a proxy operation by the proxy on the outgoing packet and wherein sending the outgoing processed packet comprises reversing a second network address translation applied to the incoming packet.

In an aspect, the proxy operation is an outgoing proxy operation, and the method 300 may include generating, by the containerized application, via the container bridge, the outgoing packet based on processing an incoming processed packet; wherein the incoming processed packet is received by the containerized application based on the first network address translation subsequent to an incoming proxy operation on the incoming packet.

In an aspect of the method 300, the incoming packet is received by the TCP proxy based on a second network address translation, and the first marking is applied by the TCP proxy to the incoming processed packet.

In an aspect, to send the incoming packet to the TCP proxy based upon the incoming packet being associated with the containerized application, the method 300 may further include routing the incoming packet to the TCP proxy based on a TCP destination port of the incoming packet being associated with the containerized application. For example, as described above with respect FIG. 2, the external interface and network stack 220 may route an incoming packet to the proxy 216 based on the TCP port (i.e., TCP port 8080) of the incoming packet being associated with the containerized application 208.

In an aspect, the method 300 may further include configuring, by a container application providing virtualized services to the containerized application, a network stack of the host network namespace to route the outgoing packet to the TCP proxy based at least in part on the second marking. For example, as described above with respect FIG. 1, the container application 122 may configure the container rules 126 of the network stack 118 to cause the network stack 118 to route incoming packets 112 and outgoing packets 114 through the proxy 120(1). In some aspects, the container application 122 may configure the container rules 126 of the network stack 118 to cause the network stack 118 to route outgoing packets 114 through the proxy 120(1) based on a marking of the marking module 128. In some aspects, the container application 122 may configure the container rules 126 of the network stack 118 to cause the network stack 118 to route incoming packets through the proxy 120(1) based on an association with the containerized application 124(1) (e.g., TCP port).

In an aspect, the proxy operation of method 300 may include an encryption operation and/or decryption operation. For example, the proxy 120(1) may encrypt or decrypt content of an incoming packet 112 or an outgoing packet 114. In an aspect, the proxy operation of method 300 may include a content filtering operation. For example, the proxy 120(1) may filter the content of an incoming packet 112 or outgoing packet 114. In an aspect, the proxy operation of method 300 may include a layer 5 operation, a layer 6 operation, and/or a layer 7 operation. For example, the proxy 120(1) may provide point-to-point tunneling protocol functionality at layer 5, transport layer security functionality at layer 6, and/or file transfer protocol functionality at layer 7.

In an aspect, the proxy operation is an outgoing proxy operation, and the method 300 may further include receiving the incoming packet from the external device, sending, using the second network address translation, the incoming packet to the TCP proxy based upon the incoming packet being associated with the containerized application, adding the first marking to an incoming processed packet to indicate that the incoming processed packet was routed through the TCP proxy, the incoming processed packet resulting from a performance of a incoming proxy operation by the TCP proxy on the incoming packet, sending, using the first network address translation, the incoming processed packet to the containerized application via the container bridge, and determining the outgoing packet based on processing the incoming processed packet via the containerized application. For example, as described above with respect to FIG. 2, at least steps 202, 212, 218, and 222 provide examples of a host device 206 configured to route an incoming packet to a containerized application 208 via a transparent proxy 216, in accordance with some aspects of the present disclosure.

While the operations are described as being implemented by one or more computing devices, in other examples various systems of computing devices may be employed. For instance, a system of multiple devices may be used to perform any of the operations noted above in conjunction with each other.

Illustrative Computing Device

Referring now to FIG. 4, an example of a computing device(s) 400 (e.g., host device 102). In one example, the computing device(s) 400 includes the processor 402 for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 402 may include other processing components such as one or more arithmetic logic units (ALUs), registers, or control units.

In an example, the computing device 400 also includes memory 404 for storing instructions executable by the processor 402 for carrying out the functions described herein. The memory 404 may be configured for storing data and/or computer-executable instructions defining and/or associated with the incoming packet 112, the outgoing packets 114, the host device 102, the network stack 118, the proxies 120(1)-(n), the container app 122, and the containerized applications 124(1)-(n), and the processor 402 may execute the network stack 118, the proxies 120(1)-(n), the container app 122, and the containerized applications 124(1)-(n). An example of memory 404 may include, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example computing device 400 may include a communications component 410 that provides for establishing and maintaining communications with one or more parties utilizing hardware, software, and services as described herein. The communications component 410 may carry communications between components on the computing device 400, as well as between the computing device 400 and external devices, such as devices located across a communications network and/or devices serially or locally connected to the computing device 400. For example, the communications component 410 may include one or more buses, and may further include transmit chain components and receive chain components associated with a transmitter and receiver, respectively, operable for interfacing with external devices. In an implementation, for example, the communications component 410 may include a connection to communicatively couple the client devices 104(1)-(N) to the processor 402.

The example computing device 400 may include a data store 412, which may be any suitable combination of hardware and/or software, that provides for mass storage of information, databases, and programs employed in connection with implementations described herein. For example, the data store 412 may be a data repository for the operating system 406 and/or the applications 408.

The example computing device 400 may include a user interface component 414 operable to receive inputs from a user of the computing device 400 and further operable to generate outputs for presentation to the user. The user interface component 414 may include one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 may include one or more output devices, including but not limited to a display (e.g., display 416), a speaker, a haptic feedback mechanism, a printer, any other mechanism capable of presenting an output to a user, or any combination thereof.

In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

Further, one or more of the subcomponents of the host device 102, the network stack 118, the proxies 120(1)-(n), the container app 122, and the containerized applications 124(1)-(n), may be implemented in one or more of the processor 402, the applications 408, the operating system 406, and/or the user interface component 414 such that the subcomponents of the host device 102, the network stack 118, the proxies 120(1)-(n), the container app 122, and the containerized applications 124(1)-(n) are spread out between the components/subcomponents of the computing device 400.

Conclusion

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method for implementing a transmission control protocol (TCP) proxy for a containerized application executing within a container of a host machine wherein the containerized application employs a container network namespace of the container and the TCP proxy employs a host network namespace of the host machine, the method comprising:
  receiving an outgoing packet from the containerized application via a container bridge, wherein the outgoing packet has a destination address external to the host machine;
  determining, based on a connection associated with the outgoing packet, whether the outgoing packet corresponds to an incoming packet identified by a first marking as being redirected through the TCP proxy;
  in response to determining that the outgoing packet corresponds to the incoming packet, adding a second marking to the outgoing packet to indicate that the outgoing packet is to be routed through the TCP proxy;
  sending the outgoing packet to the TCP proxy based on the second marking, wherein sending the outgoing packet comprises reversing a first network address translation applied to the incoming packet; and
  transmitting an outgoing processed packet to an external device having the destination address, the outgoing processed packet resulting from a performance of a proxy operation by the TCP proxy on the outgoing packet and wherein transmitting the outgoing processed packet comprises reversing a second network address translation applied to the incoming packet.

2. The method of claim 1, wherein the proxy operation is an outgoing proxy operation, and further comprising:
  generating, by the containerized application, via the container bridge, the outgoing packet based on processing an incoming processed packet;
  wherein the incoming processed packet is received by the containerized application based on the first network address translation subsequent to an incoming proxy operation on the incoming packet.

3. The method of claim 2, wherein the incoming packet is received by the TCP proxy based on a second network address translation, and wherein the first marking is applied by the TCP proxy to the incoming processed packet.

4. The method of claim 3, wherein receiving the incoming packet at the TCP proxy is based upon the incoming packet having a TCP destination port associated with the containerized application.

5. The method of claim 1, and further comprising:
  configuring, by a container application providing virtualized services to the containerized application, a network stack of the host network namespace to route the outgoing packet to the TCP proxy based at least in part on the second marking.

6. The method of claim 1, wherein the proxy operation includes an encryption operation and/or decryption operation.

7. The method of claim 1, wherein the proxy operation includes a content filtering operation.

8. The method of claim 1, wherein the proxy operation includes a layer 5 operation, a layer 6 operation, and/or a layer 7 operation.

9. The method of claim 1, wherein the first marking or the second marking is a netfilter mark value.

10. A non-transitory computer-readable device having instructions thereon for implementing a transmission control protocol (TCP) proxy for a containerized application executing within a container of a host machine wherein the containerized application employs a container network namespace of the container and the TCP proxy employs a host network namespace of the host machine that, when executed by at least one computing device, cause the at least one computing device to perform operations comprising:
  receiving an outgoing packet from the containerized application via a container bridge, wherein the outgoing packet has a destination address external to the host machine;
  determining, based on a connection associated with the outgoing packet, whether the outgoing packet corresponds to an incoming packet identified by a first marking as being redirected through the TCP proxy;
  in response to determining that the outgoing packet corresponds to the incoming packet, adding a second marking to the outgoing packet to indicate that the outgoing packet is to be routed through the TCP proxy;
  sending the outgoing packet to the TCP proxy based on the second marking, wherein sending the outgoing packet comprises reversing a first network address translation applied to the incoming packet; and
  transmitting an outgoing processed packet to an external device having the destination address, the outgoing processed packet resulting from a performance of a proxy operation by the TCP proxy on the outgoing packet and wherein transmitting the outgoing processed packet comprises reversing a second network address translation applied to the incoming packet.

11. The non-transitory computer-readable device of claim 10, wherein the proxy operation is an outgoing proxy operation, and the operations further comprise:
  generating, by the containerized application, via the container bridge, the outgoing packet based on processing an incoming processed packet;
  wherein the incoming processed packet is received by the containerized application based on the first network address translation subsequent to an incoming proxy operation on the incoming packet.

12. The non-transitory computer-readable device of claim 11, wherein the incoming packet is received by the TCP proxy based on a second network address translation, and wherein the first marking is applied by the TCP proxy to the incoming processed packet.

13. The non-transitory computer-readable device of claim 11, wherein sending the incoming packet to the TCP proxy based upon the incoming packet being associated with the containerized application comprises routing the incoming packet to the TCP proxy based on a TCP destination port of the incoming packet being associated with the containerized application.

14. The non-transitory computer-readable device of claim 10, wherein the operations further comprise:
  configuring, by a container application providing virtualized services to the containerized application, a network stack to route the outgoing packet to the TCP proxy based at least in part on the second marking.

15. The non-transitory computer-readable device of claim 10, wherein the proxy operation includes an encryption operation and/or a decryption operation.

16. The non-transitory computer-readable device of claim 10, wherein the proxy operation includes a content filtering operation.

17. A system for implementing a transmission control protocol (TCP) proxy for a containerized application executing within a container of a host machine wherein the containerized application employs a container network namespace of the container and the TCP proxy employs a host network namespace of the host machine, the system comprising:

a memory storing instructions thereon; and
at least one processor coupled with the memory and configured by the instructions to:
- receive an outgoing packet from the containerized application via a container bridge, wherein the outgoing packet has a destination address external to the host machine;
- determine, based on a connection associated with the outgoing packet, whether the outgoing packet corresponds to an incoming packet identified by a first marking as being redirected through the TCP proxy;
- in response to determining that the outgoing packet corresponds to the incoming packet, add a second marking to the outgoing packet to indicate that the outgoing packet is to be routed through the TCP proxy;
- send the outgoing packet to the TCP proxy based on the second marking, wherein sending the outgoing packet comprises reversing a first network address translation applied to the incoming packet; and
- transmit an outgoing processed packet to an external device having the destination address, the outgoing processed packet resulting from a performance of a proxy operation by the TCP proxy on the outgoing packet and wherein transmitting the outgoing processed packet comprises reversing a second network address translation applied to the incoming packet.

18. The system of claim 17, wherein the proxy operation is a first operation, and the at least one processor is further configured by the instructions to:
- configure, by a container application providing virtualized services to the containerized application, a network stack of the host network namespace to route the outgoing packet to the TCP proxy based at least in part on the second marking.

19. The system of claim 17, wherein the proxy operation is an outgoing proxy operation, and the at least one processor is further configured by the instructions to:
- generate, by the containerized application, via the container bridge, the outgoing packet based on processing an incoming processed packet;
- wherein the incoming processed packet is received by the containerized application based on the first network address translation subsequent to an incoming proxy operation on the incoming packet.

20. The system of claim 17, wherein the incoming packet is received by the TCP proxy based on a second network address translation, and wherein the first marking is applied by the TCP proxy to the incoming processed packet.

* * * * *